United States Patent
Mansour et al.

(10) Patent No.: US 9,697,614 B2
(45) Date of Patent: Jul. 4, 2017

(54) METHOD FOR SEGMENTING AND TRACKING CONTENT IN VIDEOS USING LOW-DIMENSIONAL SUBSPACES AND SPARSE VECTORS

(71) Applicant: Mitsubishi Electric Research Laboratories, Inc., Cambridge, MA (US)

(72) Inventors: Hassan Mansour, Boston, MA (US); Xin Jiang, Madison, WI (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 182 days.

(21) Appl. No.: 14/562,861

(22) Filed: Dec. 8, 2014

(65) Prior Publication Data

US 2016/0162577 A1 Jun. 9, 2016

(51) Int. Cl.
| | |
|---|---|
| G06F 17/30 | (2006.01) |
| G06T 7/20 | (2017.01) |
| G06K 9/00 | (2006.01) |
| G06T 7/215 | (2017.01) |

(52) U.S. Cl.
CPC .............. *G06T 7/2006* (2013.01); *G06K 9/00* (2013.01); *G06T 7/215* (2017.01)

(58) Field of Classification Search
None
See application file for complete search history.

(56) References Cited

U.S. PATENT DOCUMENTS

| | | |
|---|---|---|
| 7,463,754 B2 | 12/2008 | Yang et al. |
| 8,477,998 B1 | 7/2013 | Kim et al. |
| 2003/0108220 A1 | 6/2003 | Jepson et al. |
| 2014/0112575 A1* | 4/2014 | Lerman .................. G06F 17/11 382/154 |

OTHER PUBLICATIONS

Seidel F, Hage C, Kleinsteuber M. pROST: a smoothed $\ell_p$ p-norm robust online subspace tracking method for background subtraction in video. Machine vision and applications. Jul. 1, 2014;25(5)1227-40.*

(Continued)

*Primary Examiner* — Vikkram Bali
*Assistant Examiner* — Tracy Mangialaschi
(74) *Attorney, Agent, or Firm* — Gene Vinokur; James McAleenan; Hironori Tsukamoto

(57) ABSTRACT

A method segments and tracks content in a video stream including sets of one or more images by first determining measured data from each set of one or more images. An adaptive step-size parameter and a low-dimensional subspace characterizing motion of the content the measured data are initialized. A sparse vector representing a sparse component that characterizes the motion of the content different from the motion of the content characterized by the low-dimensional subspace is determined. A change in the low-dimensional subspace for the measured data is determined using a proximal point iteration and the parameter, which is updated according to the change. A low-rank subspace matrix representing the low-dimensional subspace is updated according to the change and the parameter. Then, the low-rank matrix representing the low-dimensional subspace and the sparse vector are outputted.

19 Claims, 2 Drawing Sheets

(56) References Cited

OTHER PUBLICATIONS

Klein, Stefan, et al. "Adaptive stochastic gradient descent optimisation for image registration." International journal of computer vision 81.3 (2009): 227-239.*
Berger M, Seversky LM. Subspace tracking under dynamic dimensionality for online background subtraction. In2014 IEEE Conference on Computer Vision and Pattern Recognition Jun. 23, 2014 (pp. 1274-1281). IEEE.*
Wang, Weigiang, et al. "Modeling background from compressed video." 2005 IEEE International Workshop on Visual Surveillance and Performance Evaluation of Tracking and Surveillance. IEEE, 2005.*
Elqursh, Ali, and Ahmed Elgammal. "Online moving camera background subtraction." European Conference on Computer Vision. Springer Berlin Heidelberg, 2012.*
He, Jun, Laura Balzano, and Arthur Szlam. "Incremental gradient on the grassmannian for online foreground and background separation in subsampled video." Computer Vision and Pattern Recognition (CVPR), 2012 IEEE Conference on. IEEE, 2012.*
A.Y. Aravkin, R. Kumar, H. Mansour, B. Recht, and F.J. Herrmann, "A robust svd free approach to matrix completion, with applications to interpolation of large scale data," preprint. http://arxiv.org/abs/1302.4886, 2013.
H. Mansour and A. Vetro, "Video background subtraction using semisupervised robust matrix completion," in IEEE International Conference on Acoustics, Speech, and Signal Processing (ICASSP). May 2014, pp. 6528-6532, IEEE.
L. Balzano, R. Nowak, and B. Recht, "Online identification and tracking of subspaces from highly incomplete information," in 48th Annual Allerton Conference on Communication, Control, and Computing (Allerton), Sep. 2010, pp. 704-711.
Y. Chi, Y. C. Eldar, and A. R. Calderbank, "Petrels: Parallel subspace estimation and tracking by recursive least squares from partial observations.," IEEE Transactions on Signal Processing, vol. 61, No. 23, pp. 5947-5959, 2013.
He, L. Balzano, and J. C. S. Lui, "Online robust subspace tracking from partial information," preprint, http://arxiv.org/ab1109.3827, 2011.
Chenlu Qiu and Namrata Vaswani, "Reprocs: A missing link between recursive robust PCS and recursive sparse recovery in large but correlated noise," CoRR , vol. abs/1106.3286, 2011.

* cited by examiner

Fig. 2

1: Input Sequence of measurements $\{b_t\}, m_{LOW}, m_{HIGH}$
2: Output Sequences $\{U_t\}, \{a_t\}, \{s_t\}$
3: Initialize $U_0, \mu_0, \eta_0, t = 0$
4: for $t = 1 \ldots N$ do
5:   Solve (4) using ADMM:
6:   while not converged do
7:     $a_t^k = U_{t-1}^\dagger \left(b_t - s_t^{k-1} - c_t^{k-1} + \frac{1}{\mu_{t-1}} y_t^{k-1}\right)$
8:     $c_t^k = -\Omega_t^c (U_{t-1} a_t^k)$
9:     $s_t^k = S_\lambda \left(b_t - U_{t-1} a_t^k - c_t^k - \frac{1}{\mu_{t-1}} y_t^{k-1}\right)$
10:     $y_t^k = y_t^{k-1} + \mu_{t-1}(b_t - U_{t-1} a_t^k - s_t^k - c_t^k)$
11:   end while
12:   Compute adaptive step-size:
13:   $D_t = (U_{t-1} + (b_t - s_t - c_t) a_t^T)(I_r + a_t a_t^T)^{-1}$
14:   $G_t = (I - U_{t-1} U_{t-1}^\dagger) D_t$
15:   $\eta_t = \eta_{t-1} + \mathrm{sign}\bigl(\mathrm{logit}\bigl(\frac{\langle G_t, G_t \rangle}{\|G_{t-1}\|_F \|G_t\|_F}\bigr)\bigr)$
16:   $l = \begin{cases} l+1, & \text{if } m_t \geq m_{HIGH} \\ l-1, & \text{if } m_{LOW} \leq m \leq m_{HIGH} \end{cases}$
17:   $\mu_t = \frac{\mu_{t-1}}{1+\eta_t} \frac{C^{\frac{l}{2}-1}}{1+\eta_t}$
18:   Update subspace estimate:
19:   $U_t = \frac{\mu_{t-1}}{\mu_t}(U_{t-1} + (b_t - s_t - c_t) a_t^T)(I_r + a_t a_t^T)^{-1}$
20: end for

METHOD FOR SEGMENTING AND TRACKING CONTENT IN VIDEOS USING LOW-DIMENSIONAL SUBSPACES AND SPARSE VECTORS

FIELD OF THE INVENTION

This invention relates generally to computer vision, and more particularly to segmenting and tracking content in videos.

BACKGROUND OF THE INVENTION

The problem of segmenting and tracking low-dimensional subspaces embedded in high dimensional data arises in many applications such as background segmentation, anomaly detection, motion segmentation, and target localization. For example, a scene acquired by a stationary or moving camera can be partitioned into a low-rank component spanning a subspace that characterizes a relatively stationary background in the scene, and a sparse component corresponding to moving objects in the video scene, usually in the foreground.

The problem is to identify, at every time step t, e.g., each image in a sequence of images, an r-dimensional subspace $\mathcal{U}_t$ in $\mathbb{R}^n$ with r<<n that is spanned by columns of a rank-r matrix $U_t \in \mathbb{R}^{n \times r}$ from incomplete and noisy measurements $$b_t = \Omega_t(U_t a_t + s_t), \quad (1)$$

where $\Omega_t$ is a selection operator that specifies subset of the sets of one or more images at time t, $a_t \in \mathbb{R}^r$ are coefficients specifying linear combination of columns of the subspace $U_t$, and $s_t \in \mathbb{R}^n$ is a vector of sparse outliers.

When the subspace $\mathcal{U}_t$ is stationary, the subscript t is omitted from $U_t$ and the problem reduces to matrix completion or principal component analysis (PCA) where the task is to separate a matrix $B \in \mathbb{R}^{n \times m}$ into a low-rank component UA, and a sparse component S using incomplete measurements $$B_\Omega = \Omega(UA + S).$$

The columns of the matrices A and S are respectively the vectors $a_t$ and $s_t$ stacked horizontally for all $t \in \{1 \ldots m\}$, and the selection operator $\Omega$ specifies the measured data in the matrix B.

Conventional methods for low-dimensional subspace identification first organize the measured data into a matrix and then determine basis vectors that span the subspace using a variety of techniques, e.g., low-rank matrix factorization.

Extensions of those methods factor the matrix into a low-rank component corresponding to the subspace, and a sparse component that represents noise.

However, when the dimensionality of the data becomes large, as is the case of a video, latency becomes a problem. Hence, it is necessary to provide a method that can segment and track the low-dimensional subspace as the data are acquired or processed in real-time, even when the data are incomplete and corrupted by sparse noise. Another problem is that the low-dimensional subspace (background) can vary over time, in which case the subspace cannot be represented by a low rank matrix when all data are grouped into one matrix. For example, the background in outdoor scene can vary in illumination during the day. Similarly, erstwhile moving objects can be added or removed from the background, where the are stationary, in surveillance videos.

One prior art method, U.S. Pat. No. 7,463,754, "Adaptive probabilistic visual tracking with incremental subspace update," describes a method for adaptive probabilistic tracking of an object as represented in a motion video. The method identifies an eigenbasis that represents the object being tracked. A maximum a posteriori estimate of the object location is determined using the current estimate of the eigenbasis. The eigenbasis is then updated to account for changes in the appearance of the target object.

Another prior art, US 20030108220, "Robust, on-line, view-based appearance models for visual motion analysis and visual tracking," describes learning an appearance model that includes both a stable model component, learned over a long time course, and a transient component, learned over a relatively short time course. The model parameters are adapted over time using an online expectation-maximization (EM) algorithm.

U.S. Pat. No. 8,477,998, "Object tracking in video with visual constraints," describes tracking objects represented in a video by determining tracking states of the object based on a pose model, an alignment confidence score, and an adaptive term value. The tracking state defines a likely position of the object in the frame given the object's likely position in a set of previous frames in the video.

Grassmanian Rank-One Update Subspace Estimation (GROUSE) is one method that can handle real-time subspace estimation from incomplete data, see Balzano et al., "Online identification and tracking of subspaces from highly incomplete information," 48th Annual Allerton Conference on Communication, Control, and Computing (Allerton), pp. 704-711, Sep. 2010. GROUSE uses rank-one updates of the subspace on a Grassmannian manifold. However, GROUSE can get trapped at a local minima.

Parallel Subspace Estimation and Tracking by Recursive Least Squares (PETRELS) can also identify a low-dimensional subspace in real-time, see Chi et al., "Petrels: Parallel subspace estimation and tracking by recursive least squares from partial observations," IEEE Transactions on Signal Processing, vol. 61, no. 23, pp. 5947-5959, 2013. PETRELS minimizing, in parallel, a geometrically discounted sum of projection residuals on the data for each time step using a recursive procedure with discounting for each row of the subspace matrix. Both GROUSE and PETRELS cannot correctly handle corrupted data and data subject to non-Gaussian noise.

Grassmannian Robust Adaptive Subspace Tracking Algorithm (GRASTA) is similar to GROUSE, see Cornell University, arXiv:1109.3827, Sep. September 2011. GRASTA also updates the Grassmannian manifold, but replaces the $l_2$ cost function of GROUSE with a $l_1$-norm cost function. This cost function minimizes a sum of absolute errors, while correctly handling outliers in the data.

Another real-time method is Recursive Projected Compressive Sensing (ReProCS), see Qiu et al. "ReProCS: A missing link between recursive robust PCA and recursive sparse recovery in large but correlated noise," CoRR, vol. abs/1106.3286, 2011. ReProCS recursively projects data onto a orthogonal complement of the subspace followed by sparse recovery to determine outliers. However, that method requires an accurate initial estimate of the subspace.

SUMMARY OF THE INVENTION

The embodiments of the invention provide a method and system for segmenting and tracking time-varying content of videos in real-time. The content can include a dominant component and a sparse components. The dominant component can include, e.g., a largely stationary background represented as a low-dimensional subspace. The sparse component can include moving objects represented by sparse vectors.

The video can be acquired from incomplete measurements and in the presence of noisy outliers. The method minimizes a $l_1$-norm cost function between the measurements and a projection of the measurements onto an estimate of the subspace.

Coefficients of the projection, and the sparse outliers are first determined for the current estimate of the subspace using, for example, an alternating direction method of multipliers (ADMM), and the subspace estimate is updated using a proximal point iterative procedure with an adaptive step-size parameter. The proximal point iterative procedure, similar to Newton's method, solves unconstrained smooth minimization problems involving high-dimensional data.

In one embodiment of the invention, the measurements are a sequence of images in a video. A set of one or more images are processed for each time step. For example, the set can be a group of pictures (GoP). The method characterizes the dominant stationary background of the video as the low-dimensional subspace and separates the relatively large background from sparse objects that typically characterize smaller moving objects in the video, usually in the foreground.

In another embodiment of the invention, the measurements are motion vectors extracted from a sequence of images in a compressed video. The motion vectors can represent the optical flow in the video. The method according to this embodiment identifies and tracks a dominant optical flow in the video using the low-dimensional subspace and separates the dominant optical flow from alternate optical flows, for example optical flows that are different than the dominant optical flow.

In another embodient, the measured data corresponds to interest points with feature descriptors that are extracted and tracked in a streaming video. In one example, only a subset of the extracted interest points are tracked. An adjacency matrix is constructed to characterise affinities between the feature descriptors within an image and across received video images. The method according to this embodiment identifies and tracks clusters of interest points that are represented by one or a union of subspaces that occupy a portion of the spectrum of the graph.

BRIEF DESCRIPTION OF THE DRAWINGS

FIG. 2 is a block diagram of pseudocode of the method of FIG. 1.

DETAILED DESCRIPTION OF THE PREFERRED EMBODIMENTS

Figure 1:
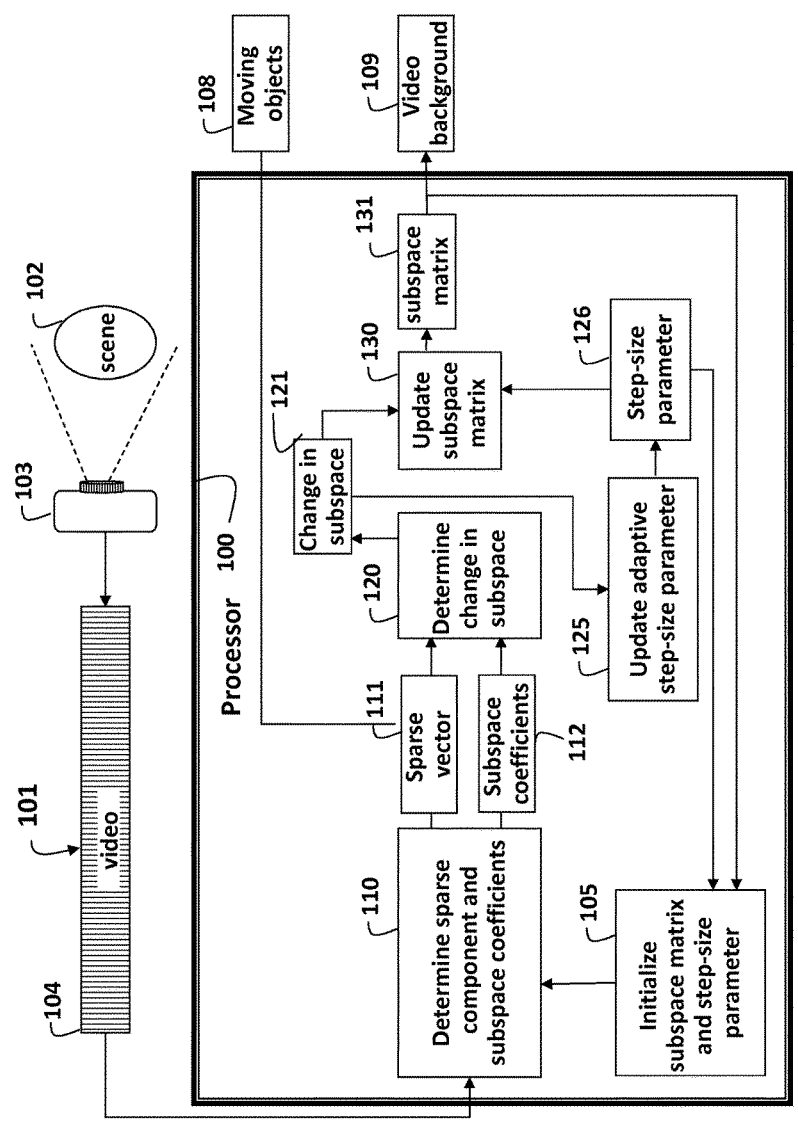
FIG. 1 is a block diagram of a method and system for processing a video according to the embodiments of the invention.

The embodiments of our invention provide a method and system for segmenting and tracking objects in a data stream that lie in low dimensional subspaces using measurements of the data stream. For example, consider a sequence of images in a video stream where a large collection of objects in the video have a dominant motion trajectory that is static or changing slowly and where other objects in the video have a different motion trajectory than the dominant trajectory.

In one embodiment, the method described in this invention separates a stationary and relatively large background component of measurements, in the form of images of a video arriving at a processor after the images are acquired, from typically sparse objects that characterize smaller moving objects in the video, usually in the foreground.

In another embodiment of the invention, the measurements are motion vectors extracted from a sequence of images in a compressed video possibly corrupted with non-Gaussian noise. The motion vectors represent the optical flow in the video that tracks the motion of a large collection of objects in the video. The method segments and tracks a dominant optical flow using the low-dimensional subspace or a union of low-dimensional subspaces.

In yet another embodiment, the measurements have missing data points. For example, if the motion vectors are extracted from only a subset of a sequence of images in a compressed video. The method of this invention determines the missing data points that correspond to the dominant optical flow after identifying the low-dimensional subspace or a union of low-dimensional subspaces.

As shown in FIG. 1, the method and system for processing measured data 101, e.g., a sequence of images in a video 101 that is acquired of a scene 102 by a camera 103. The camera can be stationary or moving. The images can be processed in real-time, for example, at the same frame (24 or 60 fps) as the images were acquired. The method operates in a processor 100 connected to memory and input/output interfaces by buses as known in the art. The memory is used to store the measured data representing the images, as well as other data structures, such as vectors, matrices and parameters used by the method.

For first measured data 104 in the stream, e.g., a first image in the video sequence, an intial subspace matrix 131 and an initial step-size parameter 126 are initialized 105. A sparse component 111, in the form of a sparse vector, and subspace coefficients 112 are determined 110 from the first measured data using an iterative solver, for example an alternating direction method of multipliers (ADMM). Next, a change in the subspace 121 is determined 120 according to the first measured data 104, the sparse component 111, and the subspace coefficients 112. An adaptive step-size parameter 126 is updated 125 according to the change in subspace 121 is updated 120. The subspace matrix 131 is then updated 130 using the change in subspace 121 and the updated adaptive step-size parameter 126. For the second measured data and every subsequent measured data in the stream, the updated subspace matrix 131 and the updated adaptive step-size parameter are used as the initial subspace matrix and the initial step-size parameter. The process is repeated iteratively until all the measured data 101 from the data stream are processed.

After the arrival of every new measured data from the stream, the moving objects 108 as represented by the sparse vector have been separated from the background as represented in the current subspace matrix 121.

FIG. 2 shows pseudocode for the detailed steps of the method. The variables used by the pseudocode are defined below.

In one embodiment, the measured data correspond to features of interest points in a video sequence. A graph is constructed from the measured data using feature descriptors, such as a Scale Invariant Feature Transform (SIFT), a Fast Retina Keypoint (FREAK), a Binary Robust Invariant Scalable Keypoints (BRISK), etc., corresponding to the interest points in order to assign edges and weights between the interest points. The method then identifies one or a union of a low-dimensional subspaces that occupy a portion of a spectrum of the graph and that characterises the dominant association between the interest points. The method also segments the dominant association from sparse or non-Gaussian distributed associations that exist in the graph spectrum.

Real-time Subspace Estimation

We describe real-time estimation of the low-dimensional subspace matrix 131 from incomplete streaming measurements 101, e.g., a compressed video, that may be corrupted with non-Gaussian noise. First, we describe our problem and define the notation used. Then, we describe minimizing a $l_1$-norm cost function between the measurements and their projection onto the subspace to determine the subspace coefficients 112, and sparse outliers 111. Then, the subspace is updated 130 using a proximal point iterative procedure, based on using least squares estimation, while updating 125 the adaptive step-size parameter 126.

As advantages, our method does not restrict the subspace update to a Grassmannian manifold as in the prior art, and uses an adaptive step size. In addition, the method does not require an accurate initial estimate of the subspace, e.g., the subspace is set to a random subspace.

Augmented Lagrangian-Based Proximal Point Iterative Procedure

The method minimizes an augmented Lagrangian with the $l_1$-norm cost function, and uses a smoothing term that maintains a proximity of the update to the previous subspace estimate over the variables ($U_t$, $s_t$, $a_t$, $y_t$). An objective cost can be represented by $$\mathcal{L}'(U_t, s_t, a_t, e_t, y_t) = \|s_t\|_1 + y_t^T(b_t - (U_t a_t + s_t + e_t)) + \frac{\mu}{2}\|b_t - (U_t a_t + s_t + e_t)\|_2^2 + \frac{\mu}{2}\|U_t - U_{t-1}\|_2^2, \quad (2)$$

where $e_t$ is supported on the complement of the selection operator $\Omega_t$, denoted $\Omega_t^c$, such that $\Omega_t(e_t)=0$ and $\Omega_t^c(e_t)=-\Omega_t^c(U_t a_t)$.

Equation (2) is non convex in the variables $U_t$ and $a_t$. Therefore, we follow the PETRELS and GRASTA approach of alternating the minimization over the variables ($s_t$, $a_t$, $y_t$) and then the variables $U_t$. By fixing $U_t$, the minimizers of equation (2) are equal, i.e., $$(s_t, a_t, y_t) = \underset{s,a,y}{\operatorname{argmin}} \mathcal{L}(s, a, y) = \underset{s,a,e,y}{\operatorname{argmin}} \mathcal{L}'(U_{t-1}, s, a, e, y). \quad (3)$$

Then, the subspace $U_t$ is updated by taking a gradient step to minimize the function $$\mathcal{F}(U_t) = \frac{1}{2}\|b_t - (U_t a_t + s_t + e_t)\|_2^2 + \frac{1}{2}\|U_t - U_{t-1}\|_2^2 \quad (4)$$

using the adaptive step-size $\mu$.

Method

As shown by the pseudocode in FIG. 2, after preliminaries, the first stage (steps 4-11) uses an iterative method, for example the ADMM, to solve equation (3). The variables $a_t$, $s_t$, and $y_t$ are determined (steps 7-10), until a termination condition is satisfied, by iterating the following sequence of updates:

$$a_t^k = U_{t-1}^\dagger \left( b_t - s_t^{k-1} - e_t^{k-1} + \frac{1}{\mu_{t-1}} y_t^{k-1} \right), \quad (5)$$

-continued $$e_t^k = -\Omega_t^c(U_{t-1} a_t^k),$$

$$s_t^k = \mathcal{S}_{\frac{1}{\mu_{t-1}}}\left(b_t - U_{t-1} a_t^k - e_t^k - \frac{1}{\mu_{t-1}} y_t^{k-1}\right),$$

and $$y_t^k = y_t^{k-1} + \mu_{t-1}(b_t - U_{t+1} a_t^k - s_t^k - e_t^k)),$$

where $\mathcal{S}_\tau(x)=\operatorname{sign}(x)\cdot\max\{|x|-\tau,0\}$ denotes an element-wise soft thresholding operator with threshold $\tau$, k indicates the iteration number, and † represents a Moore-Penrose pseudo-inverse of a matrix.

In the second stage (steps 12-17), the subspace $U_t$ is updated (step 19) by minimizing equation (4) using $$U_t = \frac{\mu_{t-1}}{\mu_t}(U_{t-1} + (b_t - s_t - e_t)a_t^T)(I_r + a_t a_t^T)^{-1}, \quad (6)$$

where $I_r$ is an r×r identity matrix, and the step size $\mu_t$ 126 is updated adaptively.

Adaptive Step-Size Parameter

For the adaptive step-size parameter, the method uses a regularizer $\mu_t$ to control the speed of convergence of the estimation of the subspace 131. In particular, a smaller value of $\mu$ allows for faster adaptability of $U_t$ to a changing subspace, i.e., with a larger descent direction, whereas a larger value of $\mu$ only allows a slower change in $U_t$.

Consider a descent direction $$D_t=(U_{t-1}+(b_t-s_t-e_t)a_t^T)(I_r+a_t a_t^T)^{-1}-U_{t-1}, \quad (7)$$

and determine its projection onto an orthogonal complement of the previous subspace estimate to obtain the change in subspace 121

$$G_t=(I-U_{t-1}U_{t-1}^\dagger)D_t. \quad (8)$$

Then, the adaptive step-size parameter $\mu_t$ 126 can be updated 125 according to $$\mu_t = \frac{C 2^{-l}}{1 + \eta_t},$$

where $$\eta_t = \eta_{t-1} + \operatorname{sigmoid}\left(\frac{\langle G_{t-1}, G_t\rangle}{\|G_{t-1}\|_F \|G_t\|_F}\right),$$

and $l \in \{-1,0,1,2\}$ are set according to predetermined thresholds for $\eta_t$. Here, $\operatorname{sigmoid}(x)=f+2f/(1+e^{10x})$ for some pre-defined $f$.

Similar to GRASTA, the intuition behind selecting such an update rule comes from the idea that if two consecutive subspace updates $G_{t-1}$ and $G_t$ have the same direction, i.e., $\langle G_{t-1}, G_t\rangle>0$, then the target subspace is still far from the current subspace estimate. Consequently, the updated step size $\mu_t$ should be smaller to allow for fast adaptability, which is achieved by increasing $\eta_t$. Similarly, when $\langle G_{t-1}, G_t\rangle<0$, the subspace update can oscillate around the target subspace and hence a larger $\mu_t$ is needed. Note that when the product of the norm of the subspace updates ($\|G_{t-1}\|_F \|G_t\|_F$) is too small, e.g., smaller than $10^{-6}$, we assume that the current subspace estimate is close to the target subspace, and we force $\eta_t$ to decrease by the magnitude of the sigmoid.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for segmenting content in a video stream, comprising:
    acquiring the video stream generated from a camera and storing the video stream in a memory, wherein the video stream includes a sequence of images acquired of a scene by the camera, wherein each image includes pixels;
    using a processor in communication with the memory, such that the processor is configured for:
    using a stored subspace matrix and an adaptive step-size parameter to determine low-dimensional subspace coefficients for an input image in the sequence of images;
    determining a background component by multiplying the stored subspace matrix with the low-dimensional subspace coefficients, such that the background component represents motion of the content in the video stream characterized by the stored subspace matrix;
    determining a foreground sparse component from a difference between the pixels in the input image and the background component, such that the foreground sparse component characterizes the motion of the content in the video stream that is different from the motion of the content in the video stream characterized by the stored subspace matrix;
    determining a foreground-free image by subtracting the pixels in the input image from the foreground sparse component;
    updating the stored subspace matrix according to the adaptive step-size parameter, such that when the updated stored subspace matrix is multiplied by the low-dimensional subspace coefficients, the updated stored subspace matrix produces an image that is similar to the foreground-free image;
    updating the adaptive step-size parameter according to an amount of change in the updating of the stored subspace matrix; and
    storing the updated adaptive step-size parameter in the memory.

2. The method of claim 1, wherein the stored subspace matrix and the adaptive step-size parameter are available, and further comprising:
    determining a data misfit function to quantify a difference between the input image and a projection of the input image onto the stored subspace matrix; and
    determining the foreground sparse component and the low-dimensional subspace coefficients that minimize the data misfit function.

3. The method of claim 2, wherein the data misfit function is a $l_1$-norm cost function.

4. The method of claim 1, wherein the input image is previously processed along with previously processed input images and new input images are available, further comprising:
    determining the stored subspace matrix and the adaptive step-size parameter from the updated stored subspace matrix and the adaptive step-size parameter of the previously processed input images.

5. The method of claim 1, further comprising:
    determining an error component that determines missing pixels from the input image using the stored subspace matrix.

6. The method of claim 1, further comprising:
    determining the amount of change in the updating of the stored subspace matrix by projecting a difference between the updated stored subspace matrix and a previous stored subspace matrix onto an orthogonal complement of the previous stored subspace matrix; and
    updating the adaptive step-size parameter by decreasing the adaptive step-size parameter when the amount of change is large and increasing the adaptive step-size parameter when the amount of change is small, relative to a previous amount of change.

7. The method of claim 1, wherein the input image is selected from a group consisting of pixel values, optical flow motion vectors or motion trajectories of feature points.

8. The method of claim 1, wherein the video stream is compressed, and further comprising:
    determining compressed motion vectors of each input image;
    determining the stored subspace matrix that characterizes a dominant motion flow in the video stream;
    determining the foreground sparse component that characterizes alternate motion flows from the dominant motion flow; and
    outputting the dominant motion flow separate from the alternate motion flow.

9. The method of claim 1, wherein each input image in the sequence of images is processed using the steps of claim 1 and stored in the memory.

10. The method of claim 1, wherein the adaptive step-size parameter controls a speed of convergence of an estimation of the stored subspace matrix.

11. The method of claim 1, wherein the low-dimensional subspace coefficients are determined using a least squares algorithm.

12. The system of claim 11, wherein a user interface in communication with the processor and the memory, acquires and stores the video stream in the memory upon receiving an input from a surface of the user interface by a user.

13. The method of claim 1, further comprising:
    outputting the foreground sparse component and the background component via an output interface in communication with the processor, wherein the foreground sparse component is used to identify objects of interest in the video stream and used to assist in further processing the video stream.

14. The method of claim 1, wherein storing the updated adaptive step-size parameter in the memory is later used to assist in updating a future stored subspace matrix.

15. A computer readable memory embodied thereon a program for segmenting content in a video stream, the program comprising instructions that when executed by a processor cause the processor to perform steps comprising:
    accessing the video stream generated from a camera stored in the computer readable memory, wherein the video stream includes a sequence of images acquired of a scene by the camera, wherein each image includes pixels;
    using a stored subspace matrix and an adaptive step-size parameter to determine low-dimensional subspace coefficients for an input image in the sequence of images;
    determining a background component by multiplying the stored subspace matrix with the low-dimensional subspace coefficients, such that the background component represents motion of the content in the video stream characterized by the stored subspace matrix;

determining a foreground sparse component from a difference between the pixels in the input image and the background component, such that the foreground sparse component characterizes the motion of the content in the video stream that is different from the motion of the content in the video stream characterized by the stored subspace matrix;

determining a foreground-free image by subtracting the pixels in the input image from the foreground sparse component;

updating the stored subspace matrix according to the adaptive step-size parameter, such that when the updated stored subspace matrix is multiplied by the low-dimensional subspace coefficients, the updated stored subspace matrix produces an image that is similar to the foreground-free image;

updating the adaptive step-size parameter according to an amount of change in the updating of the stored subspace matrix; and storing the updated adaptive step-size parameter in the computer readable memory.

16. The computer-readable memory of claim 15, wherein the input image is previously processed along with previously processed input images and new input images are available, further comprising:

determining the stored subspace matrix and the adaptive step-size parameter from the updated stored subspace matrix and the adaptive step-size parameter of the previously processed input images.

17. The computer-readable memory of claim 15, further comprising:

determining the amount of change in the updating of the stored subspace matrix by projecting a difference between the updated stored subspace matrix and a previous stored subspace matrix onto an orthogonal complement of the previous stored subspace matrix; and updating the adaptive step-size parameter by decreasing the adaptive step-size parameter when the amount of change is large and increasing the adaptive step-size parameter when the amount of change is small, relative to a previous amount of change.

18. A system for segmenting content in a video stream, comprising:

at least one camera generating the video stream in communication with a computer readable memory to produce the video stream;

an output interface;

a processor in communication with the computer readable memory, is configured to:

access the video stream, wherein the video stream includes a sequence of images acquired of a scene by the camera, wherein each image includes pixels;

using a stored subspace matrix and an adaptive step-size parameter to determine low-dimensional subspace coefficients for an input image in the sequence of images;

determining a background component by multiplying the stored subspace matrix with the low-dimensional subspace coefficients, such that the background component represents motion of the content in the video stream characterized by the stored subspace matrix;

determining a foreground sparse component from a difference between the pixels in the input image and the background component, such that the foreground sparse component characterizes the motion of the content in the video stream that is different from the motion of the content in the video stream characterized by the stored subspace matrix;

determining a foreground-free image by subtracting the pixels in the input image from the foreground sparse component;

updating the stored subspace matrix according to the adaptive step-size parameter, such that when the updated stored subspace matrix is multiplied by the low-dimensional subspace coefficients, the updated stored subspace matrix produces an image that is similar to the foreground-free image;

updating the adaptive step-size parameter according to an amount of change in the updating of the stored subspace matrix; and storing the updated adaptive step-size parameter in the computer readable memory.

19. The system of claim 18, wherein a user interface in communication with the processor and the computer readable memory, acquires and stores the video stream in the computer readable memory upon receiving an input from a surface of the user interface by a user.

* * * * *